UNITED STATES PATENT OFFICE 2,485,841

RECOVERY OF URANIUM AND VANADIUM FROM ORES

Arnold Pacyna, Lyndhurst, N. J.

No Drawing. Application October 29, 1940,
Serial No. 363,313

9 Claims. (Cl. 23—14.5)

This invention relates to chemistry particularly to the treatment of ores containing vanadium and uranium compounds and more especially to the treatment of carnotite ore.

A principal object of this invention is the provision of a process for the recovery or extraction of vanadium and uranium compounds from ores, and particularly carnotite, especially as oxides.

Other objects and advantages will appear as the description of the particular specific process selected to illustrate the invention progresses and the novel features will be particularly pointed out in the appended claims.

In describing the invention in detail, a specific process and the several steps thereof will be fully described as illustrative of the principles underlying the invention.

It is well known that the chemical elements, vanadium and uranium, occur in ores, particularly in carnotite, in which they may be present, in certain grades, up to about 3%, reckoned as vanadium pentoxide ($V_2O_5$) and up to about 0.40% reckoned as uranium octoxide ($U_3O_8$).

In practicing the specific form of the process, the ore should first be reduced by any suitable or appropriate means or method of a suitable fineness, preferably such that it will all go through a 40 to 100 mesh screen.

The first step in applicant's process is to oxidize, the preferable method is to mix, by an appropriate or suitable method, the ore with bleaching powder ($CaOCl_2$), 12% active chlorine. About eight parts bleaching powder to one hundred parts of ore should be used, although this proportion may be varied according to the metallic compounds present in the ore to be oxidized to the highest state.

After the mixing of the ore with the bleaching powder, the mixture is to be treated with a suitable mineral acid, such as hydrochloric, to liberate the oxidizing agent, and preferably with commercial, 1.84 specific gravity sulphuric acid. The amount of acid used should be about 8 parts by weight to every 100 parts of ore although the proportion may vary from 5 parts to 10 parts; in any event, an excess of acid must be used to be sure when the glycollate is used, as later described, the solution will be acid. The sulphuric acid is to be added to the ore and bleaching powder, placed in a suitable or appropriate vessel, while the mixture is, preferably, being constantly and vigorously stirred to prevent localized action. The mixture should then be allowed to stand until all chlorine fumes have been given off.

The mixture resulting from the above treatment is then gently heated to a dry powder and until the odor of hydrochloric acid fumes are distinctly apparent which evidences the completion of the oxidation.

The mixture is then allowed to cool to room temperature and about 8 parts dry ammonium chloride are added with a thorough grinding mix. The ammonium chloride may be used in amount from 3 parts per 100 parts of ore to about 12 parts to 100 parts of ore. This ammonium chloride acts to prevent decomposition of a thioglycollate which is later used.

The material is then transferred to any suitable vessel, one made of wood is suitable, together with about 185–190 parts of warm water and in addition there is added to the water about 10 to 15 parts of a solution of dithiodiglycollate made in the following described manner, and the whole heated nearly to a boil.

The dithiodiglycollate is made as follows: 42.75 grams of monochlor acetic acid (technical) are added to 118 c. c. of hot water and let stand until completely dissolved. This will be called solution I.

24.75 grams of sodium hydroxide (technical), or an equivalent of potassium hydroxide, are dissolved in 100 c. c. of water. This will be called solution II.

The two just above described solutions are combined and set aside. This will be called solution III.

Then take 14.4 grams of flowers of sulphur and 57.6 grams of white crystallized sodium sulphide ($Na_2S.9H_2O$) and place together with 300 c. c. of boiling water and heat until all the flowers of sulphur are dissolved and then cool to 90° C. This will be called solution IV.

Combine solutions III and IV and heat at 90° C. for one hour and then filter from sulphur. The solution will probably contain sodium dithiodiglycollate, the formula of which is probably

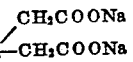

The solution containing the ore after standing for about one hour is then separated from the residue by decantation. Then about 200 parts of boiling wash water are added, with stirring, to the residue and then the mass allowed to settle and the fluid is again decanted. As many washings may be made as desired to exhaust the residue from vanadium and uranium compounds. In any event, the residue will probably retain about 0.3% of vanadium reckoned as pentoxide.

The first decanted liquid is retained separate from the wash waters.

Several more portions of the same amount of ore are taken, say four, and each treated separately as before with bleaching powder, sulphuric acid and ammonium chloride, but the proportions are 5 parts of bleaching powder, 3 to 5 parts of sulphuric acid and 3 parts of ammonium chloride. Then each portion of ore is treated as before with the diglycollate solution, but instead of using an entirely fresh solution, the first decanted liquor obtained as above described is heated to 90° and used first on one portion of treated ore, together with an additional 10 parts of the solution of sodium glycollate prepared as above described, then after decanting is heated and used on a second portion and so on until each portion is treated, adding for each portion treated an additional 10 parts of the fresh sodium glycollate solution. Likewise the wash waters are used first to wash the first portion of ore treated and then each other portion in rotation. The final result is a liquor which contains all of the extractable vanadium and uranium compounds in the ore with the exception of that in the wash waters, but these wash waters are combined therewith so that one solution contains all. This solution is then filtered by any of the usual and ordinary methods. The whole should be so carried out, if possible, so that the filtrate will be about four times the weight of the ore treated.

The filtrate above obtained contains substantially all of the vanadium and uranium values in the original ore.

The above obtained filtrate is then made almost alkaline, with an alkali such as sodium hydroxide or potassium hydroxide, preferably, 28% ammonia water. The whole is stirred until the precipitate first formed completely redissolves. The amount of alkali added must be such that a permanent precipitate is not formed, that is, the filtrate is made just short of alkaline.

To cause actual permanent precipitation, sodium or potassium bicarbonate is added in powder form. Sufficient must be added to ensure complete precipitation of the vanadium and uranium and any iron present. In the instant case about 5 parts per hundred of filtrate, that is, about 100 grams of sodium bicarbonate would be required. The precipitate formed by the bicarbonate is somewhat granular and so filters fairly easily. After adding the bicarbonate, the whole is heated until it turns nearly black. Then it is filtered. The filtrate contains the unconsumed glycollate which is returned to the process to be used either as it is or after concentration or enrichment.

The precipitate contains substantially all the vanadium and uranium. This is dried and ignited to remove all traces or organic matter. To complete this, it is sprinkled, while hot, with a small amount of sodium nitrate.

The so prepared precipitate is then ground to a fine powder and ground mixed with an equal weight of sodium carbonate and an equal weight of common salt and heated to incipient fusion. Then two parts per hundred weight of precipitate of sodium nitrate is added which helps the fusion and ensures complete oxidation.

When the fusion is cool it is lixiviated with water and boiled and then filtered, the residue being rejected.

By the fusion processes all of the iron of the precipitate is eliminated.

The last obtained filtrate is then treated with about 1 to 2 grams of ammonium chloride to each 100 grams of ore treated, and then ammonia is added until complete precipitation of aluminium calcium and silicon, if pure uranium compounds are to be later obtained. After filtering, the filtrate is cooled to room temperature and acidified with sulphuric acid to drive off carbonic acid, and on heating, the solution should be substantially clear and free of carbonic acid. If not, it should be further acidified.

To the solution is added nitric acid sufficient to oxidize the uranium to its highest state and, preferably, then made alkaline, with ammonia, and boiled. The uranium will precipitate as $U_3O_8$. The precipitate after separation may be handled in any suitable manner, as by drying and ignition.

After filtering, the filtrate obtained is again made acid with sulphuric acid and heat is applied until a clear brown solution results. A slight amount of sodium chlorate, sufficient to bring the vanadium to its highest state of oxidation is added. This may be added either before or after phthalic anhydride is added. When phthalic anhydride is added, it is in about the proportion of 2 to 4 grams to 500 grams of ore treated. The whole is then boiled until everything is dissolved and until a slight turbidity appears. Then the solution is set aside about 5 to 10 hours to cool and about 25 grams of methyl or ethyl alcohol for each 500 grams of ore treated, added. After standing, a yellow precipitate, probably vanadium phthalate comes down in quantitative amounts. Then it is filtered and washed with cold water containing methyl or ethyl alcohol and the precipitate dried. When this is heated the phthalic anhydride goes off and on further strongly heating a mass of vanadium pentoxide ($V_2O_5$) remains.

The last obtained decanted liquid and filtrate contain phthalic anhydride and alcohol. The alcohol may be distilled off and returned to the process, and the remaining liquor containing the phthalic anhydride and traces of vanadium may also be returned to the process.

Although I have particularly described the invention by particularly describing one specific procedure, I desire to have it understood that the principles underlying the invention are not exclusively exhibited by the particular specific process described, and I do not intend to exclude by the illustrative procedure the other possible exhibitions of the principle underlying the invention.

What I claim as new and desire to secure by Letters Patent of the United States, is:

1. In a process of extracting vanadium and uranium from an ore containing these metals, the steps of first pulverizing the ore, then oxidizing the vanadium and uranium compounds therein and then extracting the vanadium and uranium compounds by treatment with a water solution of sodium dithioglycollate.

2. The process of extracting a compound of vanadium and of uranium from an ore containing compounds of these metals which comprises the steps of first pulverizing the ore to a fineness such that it will go through a screen having forty meshes to the linear inch, then oxidizing with chlorine, then extracting with a water solution of sodium dithioglycollate.

3. The process of extracting a compound of vanadium and of uranium from an ore containing compounds of them which comprises the steps of first pulverizing the ore to a fineness such that it will go through a screen having twenty-five meshes to the linear inch, oxidizing with bleaching powder and a mineral acid then extracting with a water solution of sodium dithioglycollate.

4. The process of dissolving vanadium and uranium oxides, which comprises treating the oxides with a water solution of sodium dithiodiglycollate under such conditions that the oxides are dissolved.

5. The process of dissolving vanadium and uranium higher oxides, which comprises treating the higher oxides with a water solution of sodium dithioglycollate under such conditions that the oxides are dissolved.

6. The process of dissolving vanadium pentoxide, which comprises treating the vanadium pentoxide with a water solution of sodium dithioglycollate under such conditions that the pentoxide is dissolved.

7. The process of dissolving vanadium pentoxide, by treatment with a water solution of sodium dithiodiglycollate in the presence of ammonium chloride under such conditions that the oxides are dissolved.

8. The steps of extracting a compound of vanadium and of uranium from an ore containing compounds of these metals and iron compounds which comprises the steps, of first pulverizing the ore to a fineness such that it will go through a screen having forty meshes to the linear inch, then oxidizing the ore with chlorine, then extracting with a water solution of sodium dithioglycollate to form a solution of vanadium, uranium, and iron compounds, then precipitating iron, vanadium and uranium compounds from the solution by the addition of sodium carbonate, then separating the precipitate, removing organic matter from the precipitate by igniting it and adding sodium nitrate to the residue from the ignition step and then fusing the ignited and oxidized residue with sodium nitrate, then fusing with sodium carbonate and salt, lixiviating the fused product with water and filtering, thus securing the vanadium and uranium compounds in the filtrate.

9. The steps in extracting a compound of vanadium and of uranium from an ore containing compounds of these metals and aluminum and iron compounds which comprises the steps of first pulverizing the ore to a fineness such that it will go through a screen having forty meshes to the linear inch, then oxidizing the ore with chlorine, then extracting with a water solution of sodium dithioglycollate to form a solution of vanadium, aluminum, uranium and iron compounds, then precipitating iron, vanadium and uranium compounds from the solution by the addition of sodium carbonate, separating the precipitate, removing organic matter from the precipitate by igniting it and adding sodium nitrate to the residue from the ignition step then fusing the ignited and oxidized residue with sodium carbonate and salt, lixiviating the fused product with water and filtering, thus securing the vanadium, aluminum and uranium compounds in the filtrate, then adding ammonium chloride to precipitate aluminum compounds, filtering and to the filtrate adding sulphuric acid until acid, boiling and then making alkaline with ammonia and boiling and separating the precipitate.

ARNOLD PACYNA.

REFERENCES CITED

The following references are of record in the file of this patent:

UNITED STATES PATENTS

| Number | Name | Date |
|---|---|---|
| 863,076 | Lucio | Aug. 13, 1907 |
| 1,129,029 | Vogt | Feb. 16, 1915 |
| 2,199,697 | Fleck | May 7, 1940 |
| 2,211,119 | Hixson | Aug. 13, 1940 |

OTHER REFERENCES

Beilstein: "Handbuch der Organischen Chemie, Band III, page 254, Vierte Auflage.